(12) United States Patent
Shimizu et al.

(10) Patent No.: US 8,409,119 B2
(45) Date of Patent: Apr. 2, 2013

(54) WALKING ASSISTANCE DEVICE

(75) Inventors: Hideo Shimizu, Wako (JP); Tatsuya Noda, Wako (JP); Taiji Koyama, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 391 days.

(21) Appl. No.: 12/785,013

(22) Filed: May 21, 2010

(65) Prior Publication Data

US 2010/0298746 A1    Nov. 25, 2010

(30) Foreign Application Priority Data

May 25, 2009   (JP) .................................. 2009-125124

(51) Int. Cl.
*A61H 1/02* (2006.01)
*A61H 1/00* (2006.01)

(52) U.S. Cl. ............................... 601/35; 601/23; 601/34

(58) Field of Classification Search ................ 601/5, 23, 601/26–35; 602/5, 16, 23; 623/24, 27, 28, 623/31, 32, 39, 40
See application file for complete search history.

(56) References Cited

U.S. PATENT DOCUMENTS

| | | | | |
|---|---|---|---|---|
| 2,694,781 | A * | 11/1954 | Hinz ................................. | 310/77 |
| 7,278,979 | B2 * | 10/2007 | Shimada et al. ................. | 602/16 |
| 2007/0027409 | A1 * | 2/2007 | Katoh et al. ...................... | 601/5 |
| 2007/0038168 | A1 * | 2/2007 | Turrini et al. ................... | 602/16 |
| 2009/0306554 | A1 * | 12/2009 | Yasuie ............................. | 601/5 |
| 2010/0234777 | A1 * | 9/2010 | Yasuhara et al. ................ | 601/35 |

FOREIGN PATENT DOCUMENTS

| | | |
|---|---|---|
| JP | 2004-344305 | 12/2004 |
| JP | 2006320350 | 11/2006 |

* cited by examiner

*Primary Examiner* — Justine Yu
*Assistant Examiner* — Christopher Miller
(74) *Attorney, Agent, or Firm* — Squire Sanders (US) LLP (57) ABSTRACT

A walking assistance device including a pelvic frame (10) extending from a lower back to each lateral side of a user, and a belly belt (20) for securing the pelvic frame in position. A power generator (30) is attached to each lateral side of the pelvic frame. A power transmitting arm (40) can be attached to an output member (33) of the power generator simply by hooking an upper part of a base end (41) of the power transmitting arm onto an upper groove (38) of the output member, and pushing a latch member or a slider (46) provided in a lower part of the base end onto a lower groove (39) of the output member. The user wearing the pelvic frame (10) can easily attach the power transmitting arm (40) to the output end of the power generator (30) by easily using a single hand without requiring help.

8 Claims, 11 Drawing Sheets

WALKING ASSISTANCE DEVICE

TECHNICAL FIELD

The present invention relates to a walking assistance device, and in particular to a walking assistance device incorporated with a power actuator or a rotary power generator to provide a walking assistance force to a lower limb of a user.

BACKGROUND OF THE INVENTION

There have been proposed various forms of walking assistance devices that assist movement of a lower limb of a person who has become unable to walk by himself or herself owing to a diminished muscle power that is typically caused by an injury, disease or aging. Such a device may be used not only for aiding the effort required for the user to walk but also for aiding the rehabilitation of the user who is in the process of regaining the capability to walk.

Such a device typically comprises a C-shaped pelvic frame extending from a lower back of the user to either side of the pelvis, a pair of power actuators attached to corresponding side parts of the pelvic frame and a pair of power transmitting arms each having a first end attached to the output end of the corresponding power actuator and a second end connected to a support member for the thigh or leg of the user. See Japanese patent laid open publication No. 2004-344305 (patent document 1), and Japanese patent laid open publication No. 2006-320350 (patent document 2), for instance.

Patent document 2 discloses a device that incorporates a power actuator and a power transmitting arm as an integrated drive unit in such a manner that the drive unit may be detachably attached to a pelvic frame. In particular, the mounting and dismounting of the drive unit on and from the pelvic frame can be readily accomplished without requiring a tool or the like by using a latch mechanism.

However, according to such a conventional arrangement, the user is required to handle the relatively heavy drive unit when attaching and detaching the drive unit to and from the pelvic frame. Therefore, the user experiences some difficulty in attaching the drive unit to the pelvic frame, after wearing the pelvic frame, by himself or herself, and often requires the help of a caretaker when attaching the drive unit to the pelvic frame.

The user may also be able to attach the drive unit to the pelvic frame before wearing the pelvic frame, but may experience some difficulty in wearing the pelvic frame which is burdened by the weight of the drive unit. Therefore, the user may require a help of a caretaker.

BRIEF SUMMARY OF THE INVENTION

In view of such problems of the prior art, a primary object of the present invention is to provide a walking assistance device that can be worn and removed with ease.

A second object of the present invention is to provide a walking assistance device that can be worn and removed without requiring a help from another person.

A third object of the present invention is to provide a walking assistance device that can transmit the power generated by a rotary power generator to a power transmitting arm connected to an output end of the rotary power generator.

According to the present invention, such objects can be accomplished by providing a walking assistance device, comprising: a pelvic frame configured to be worn on a pelvic part of a user and extending from a lower back of the user to either side of the pelvic part of the user; a rotary power generator attached to each side part of the pelvic frame; and a power transmitting arm having a base end detachably connected to an output member of the power generator and a free end extending downward from the base end and fitted with a support member for supporting a lower part of a thigh of the user; wherein the output member is provided with an upper engagement feature formed on an upper side of the output member, a lower engagement feature formed on a lower side of the output member and a pair of planar engagement faces formed on a diametrically opposing sides of the output member and slanted toward a rotational center of the output member and a free axial end thereof; and wherein the base end of the power transmitting arm comprises a hooking member configured to be engaged by an upper engagement feature of the output member, a latch member provided in a part of the base end diametrically opposing the hooking member and configured to detachably engage the lower engagement feature of the output member and a pair of slanted engagement faces complementary to the engagement faces of the output member, each slanted engagement face of the base end making a surface to surface contact to the corresponding engagement face of the output member when the hooking member is hooked on the upper engagement feature and the latch member is engaged by the lower engagement feature.

Thus, the user can first wear the pelvic frame without the power transmitting arms attached thereto without being burdened by the power transmitting arms. Each power transmitting arm can be worn simply by hooking an upper part of the base end of the power transmitting arm onto the upper engagement feature while the lower part of the base end is spaced from the output member of the rotary power generator, and then latching the lower part of the base end of the power transmitting member to the lower engagement feature. The hooking and latching engagement ensures the attachment between the power transmitting arm and output member of the power generator. The face to face engagement between the slanted engagement face of the base end and corresponding engagement face of the output member ensures a positive torque transmission between them free from play.

According to a preferred embodiment of the present invention, the latch member is guided for a radial inward movement with respect to base end to a position for engaging the lower engagement feature and a radially outward movement with respect to the base end for disengaging the lower engagement feature and provided with a knob for manual operation thereof, and the base end further comprises a spring member that urges the latch member to the position for engaging the lower engagement feature. For added convenience, at least one of a free end of the latch member and lower engagement feature may be provided with a slanted surface that causes the latch member to move radially outward when the latch member is pushed against the lower engagement feature so that a secure engagement may be achieved simply by pushing the latch member against a corresponding part of the lower engagement feature.

According to another preferred embodiment of the present invention, the latch member is guided for a radial inward movement with respect to the base end to a position for engaging the lower engagement feature and a radially outward movement with respect to the base end for disengaging the lower engagement feature, and the base end further comprises a manual lever pivotally supported by the base end at a first pivot point and a toggle link having a first end pivotally connected to an end of the manual lever at a second pivot point and a second end pivotally connected to an end of the latch member at a third pivot point, the first, second and third pivot points being aligned along a line of movement of the latch member when the latch member is at the position for engaging the lower engagement feature.

The toggle mechanism allows the latch member to be actuated with ease while preventing the inadvertent release of the latch mechanism.

Typically, the upper engagement feature includes a horizontal groove having an upwardly facing opening. In a particular preferred embodiment of the present invention, the base end may comprise a cup-shaped member having an open side facing a user and having the hooking member and engagement faces formed in an inner part of the cup-shaped member so that the external appearance of the device may be enhanced, and the user may comfortably handle the base end of the power transmitting arm. In this case, the latch member may be passed across a lower peripheral wall of the cup-shaped member, and each engagement face of the base end may be defined by a pair of ribs extending between a bottom wall and a peripheral wall of the cup-shaped member.

BRIEF DESCRIPTION OF THE DRAWINGS

Now the present invention is described in the following with reference to the appended drawings, in which.

DETAILED DESCRIPTION OF THE PREFERRED EMBODIMENTS

A walking assistance device embodying the present invention is described in the following with reference to FIGS. 1 to 8. The illustrated walking assistance device comprises a pelvic frame 10 that can be detachably attached to a pelvic part of a user by using a belly belt 20. The pelvic frame 10 essentially consists of a relatively stiff member made of molded plastic material such as carbon reinforced plastic material, and includes a middle part 11 located centrally on a lower back portion of the user and a pair of side extensions 12 extending from the middle part 11 along either side of the pelvis of the user so as to define a shape of letter-C as seen in plan view.

Figure 1:
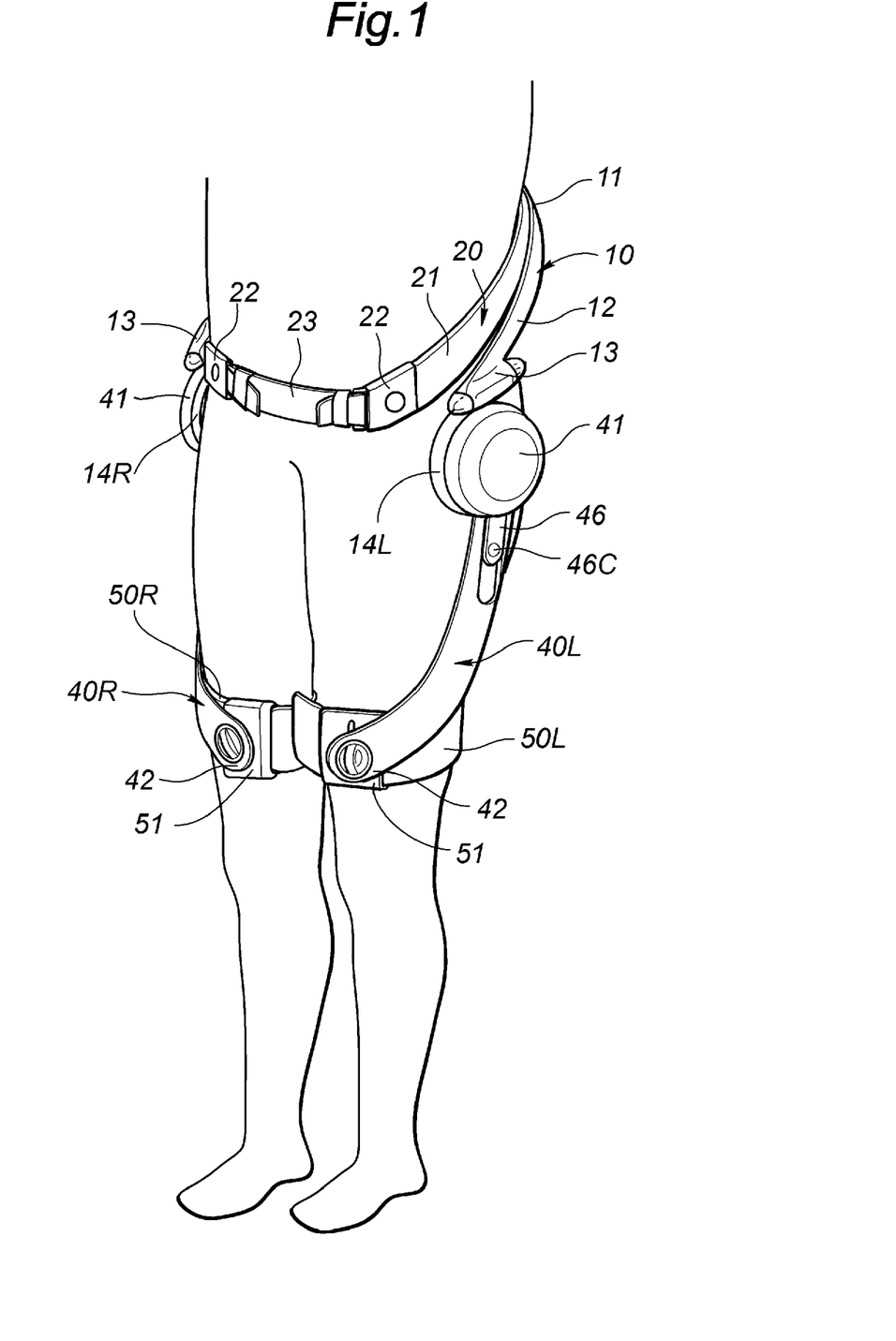
FIG. 1 is a perspective view of a walking assistance device embodying the present invention as worn by a user.
Figure 2:
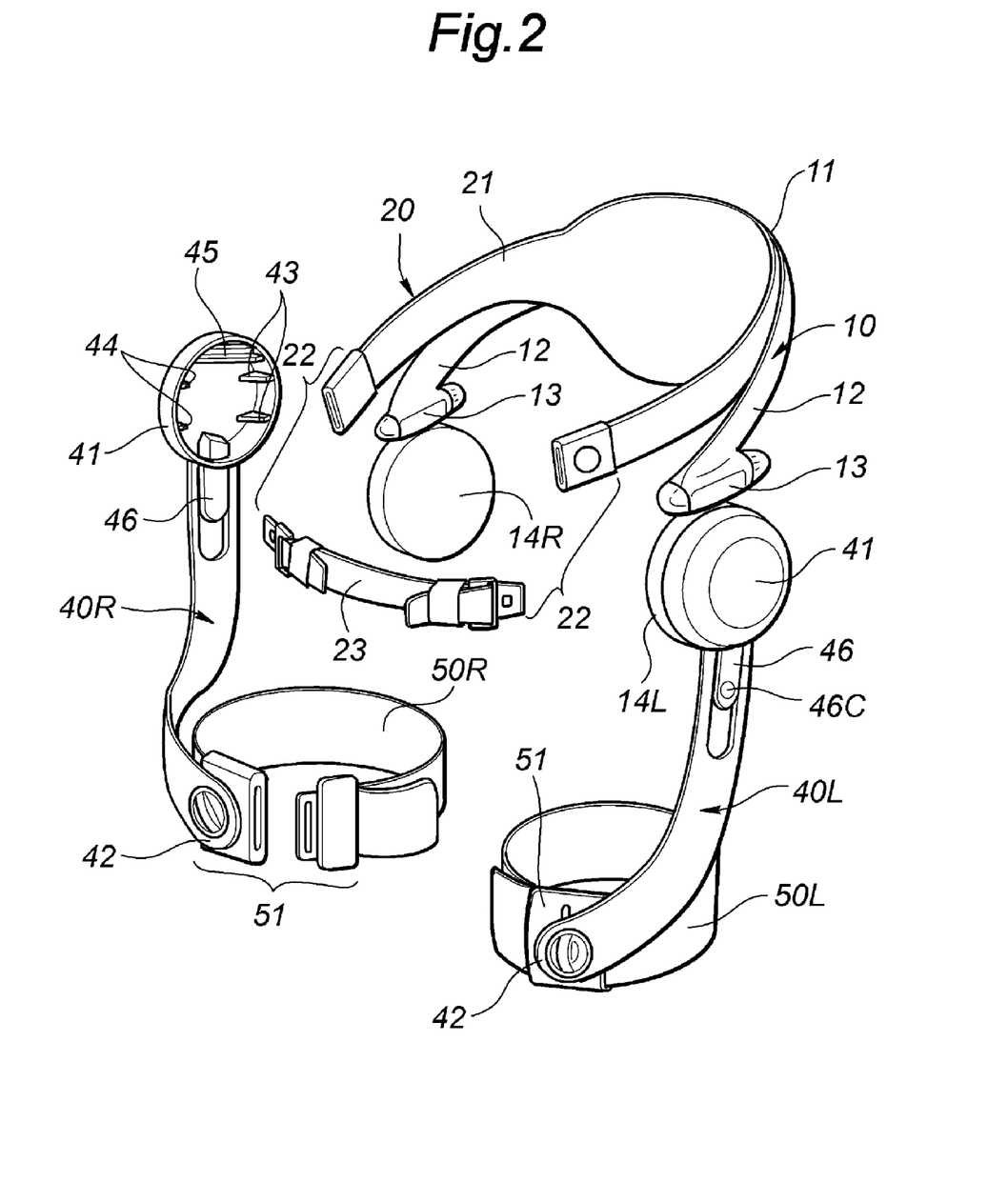
FIG. 2 is an exploded perspective view of the walking assistance device shown in FIG. 1.

The belly belt 20 is made of flexible material having a relatively high tensile strength such as woven fabric, synthetic leather, natural leather and plastic, and includes a pair of belt main sections 21 connected to the middle part 11 of the pelvic frame 10 and extending along the back and both sides of the user and a detachable belt section 23 connected between the free ends of the belt main sections 21 via belt buckles 22 and engaging a lower abdominal part of the user. The belt main sections 21 and detachable belt section 23 jointly form a closed loop so as to retain the pelvic frame 10 to the pelvic part of the user.

On the back side of the central part 11 of the pelvic frame 10 is attached a housing (not shown in the drawings) that receives a power unit including a rechargeable secondary battery and a control unit therein.

The free end of each side extension 12 of the pelvic frame 10 suspends a corresponding power generator case 14 (14L and 14R) via a hinge 13 having a hinge axis extending in a fore-and-aft direction. The power generator case 14 receives a rotary power generator such as an electric motor 30 (FIG. 4) therein. In the appended drawings, the power generators and associated component parts are each denoted with a numeral accompanied by a suffix such as R and L to indicate on which side the corresponding part is located. However, in the following description, only one of the rotary power generators is described, and the relevant parts are denoted simply by numerals without the suffix because the two rotary power generators are not essentially different from each other.

Figure 4:
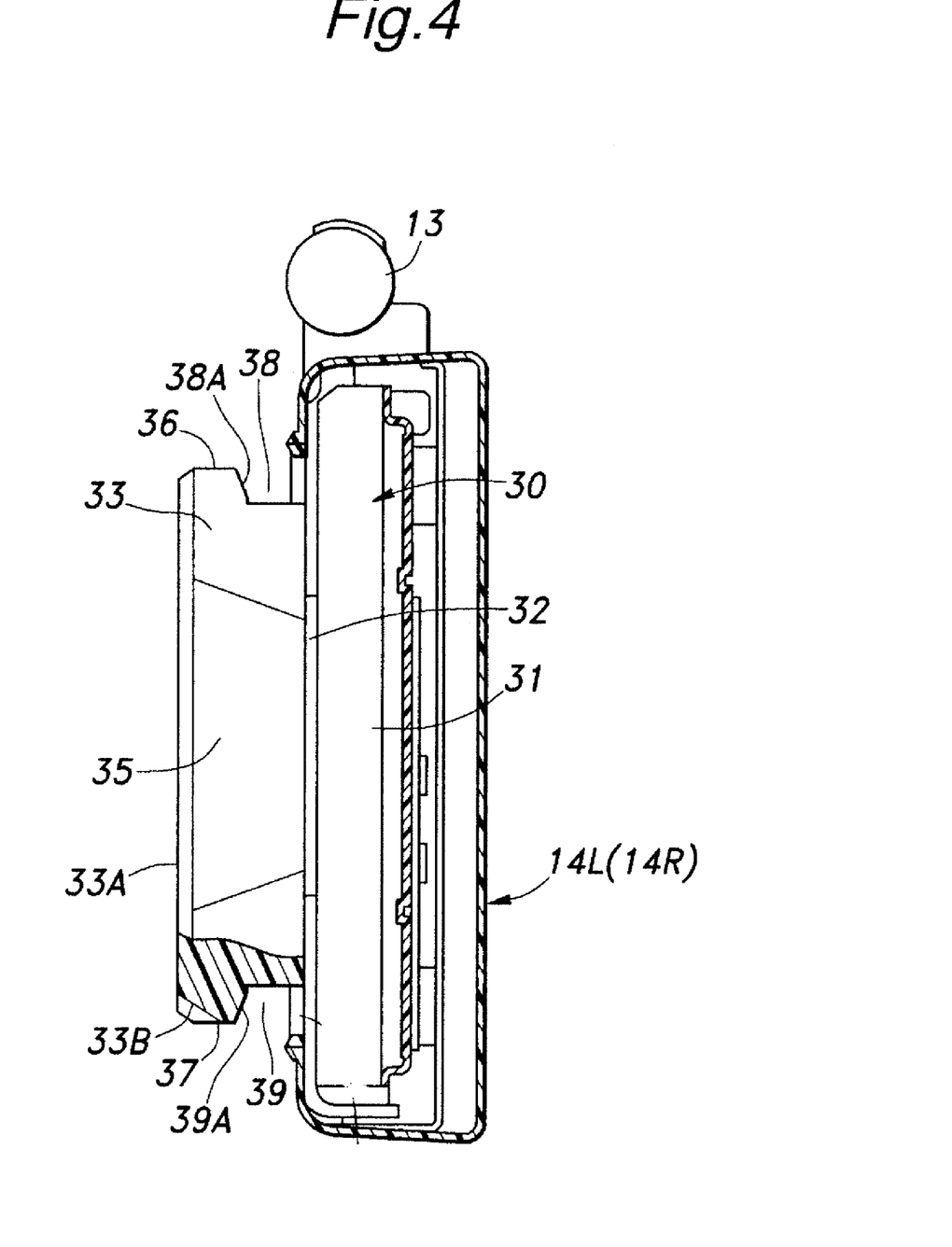
FIG. 4 is a sectional view taken along line IV-IV of FIG. 3.
Figure 5:
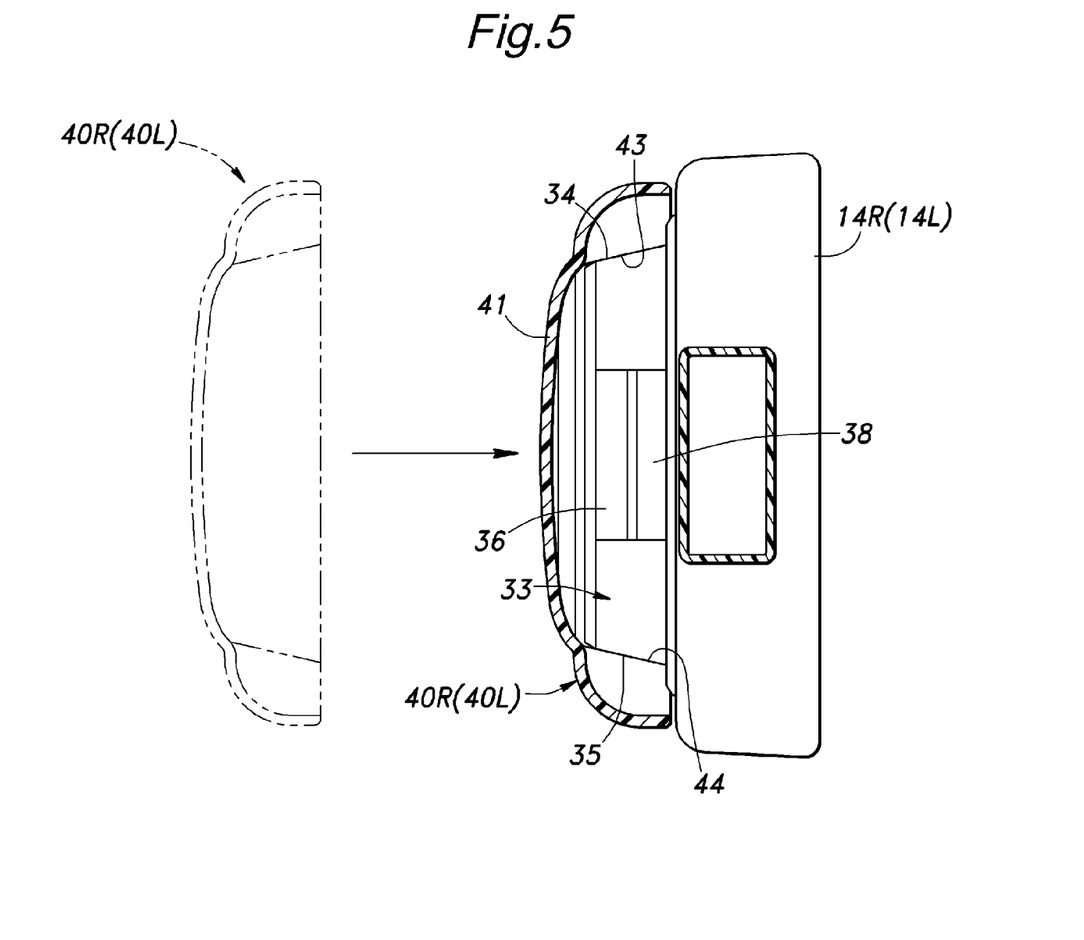
FIG. 5 is a sectional view taken along line V-V of FIG. 3.

The electric motor 30 consists of a low profile brushless DC motor, and comprises a motor housing 31 having a short cylindrical shape and incorporated with a stator member (not shown in the drawings) and a rotor (not shown in the drawings) having a rotor shaft 32 rotatably supporting the rotor in an inner bore of the stator member.

The motor housing 31 is fixedly attached to the power generator case 14. As the power generator case 14 is attached to the corresponding end of the pelvic frame 10 via the hinge 13, the power generator case 14 may also be considered as a part of the pelvic frame 10. Thus, the two electric motors 30 are arranged on parts of the pelvic frame 10 corresponding to either side of the pelvic portion of the user or more specifically adjacent to the hip joints of the user. In particular, the rotor shaft 32 projects laterally outward away from the user, and an output member 33 is integrally attached to the free end of the rotor shaft 32.

Figure 3:
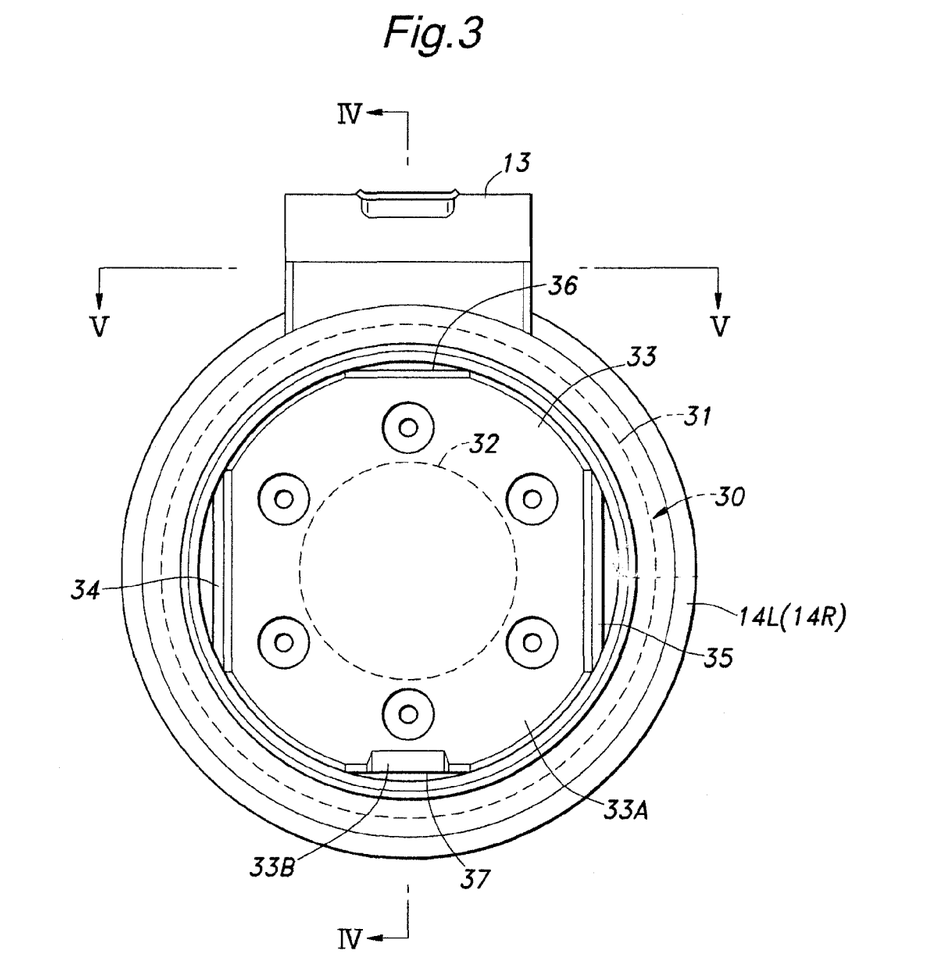
FIG. 3 is a front view of a rotary power generator of the walking assistance device.

The output member 33 of each electric motor 30 extends laterally outward away from the user, and is formed as a disk having a rotational center line in the geometric center thereof. The output member 33 is provided with a pair of mutually opposite side faces 34 and 35 for the purpose of transmitting the rotational torque of the output member 33 to a power transmitting arm 40 as will be described hereinafter. The side faces 34 and 35 are given with a slight taper in the axial direction so as to converge into a single line as one moves laterally away from the user. The two faces are thus not in parallel to each other, but the ridge lines of the side faces 34 and 35 defined by the side faces 34 and 35 and an axial end face 33A of the output member 33 (which is coaxial with the rotational center of the output member) are parallel to each other. The side faces 34 and 35 may be called as engagement faces 34 and 35 in the following description.

The output member 33 is additionally provided with another pair of side faces (upper and lower side faces) 36 and 37 at positions angularly displaced from the engagement faces 34 and 35 by 90 degrees. Therefore, the output member 33 is provided with four side faces 34, 35, 36 and 37 at an interval of 90 degrees along the outer periphery thereof.

The latter side faces 36 and 37 are each formed with a groove 38, 39 extending in parallel with the ridge line defined by the side faces 36 and 37 and axial end surface 33A. Each groove 38, 39 is provided with a pair of slanted side walls so as to have a width that gets smaller toward the bottom of the groove.

In each power generator case 14, the base end 41 of a power transmitting arm 40 is detachably attached to the output member 33 of the electric motor 30 in a torque transmitting relationship, and is formed as a cup-shaped member having an open side facing the user. Each power transmitting arm 40 which may also be called as a thigh frame or thigh movement arm may essentially consist of an elongated plate member typically made of light alloy such as aluminum alloy or stiff plastic material such as carbon reinforced plastic material. The power transmitting arm 40 comprises, in addition to the base end 41 configured to be connected to the output member 33, a free end 42 extending downward from the base end 41 along an outer side of the thigh and twisted toward a front part of the thigh slightly above the knee cap. Therefore, the major plane of the power transmitting arm 40 extends in both the fore-and-aft and vertical directions in the part thereof adjacent to the base end 41 and extends in both the lateral and vertical directions in the part thereof adjacent to the free end 42.

To the free end 42 of the power transmitting arm 40 is pivotally attached a corresponding thigh belt 50 which is made of flexible material having a relatively high tensile strength such as woven fabric, synthetic leather, natural leather and plastic. The thigh belt 50 is configured to be passed around the thigh of the user at the height of the free end 42 (slightly above the kneecap of the user), and is provided with a buckle 51 that detachably fastens the thigh belt 50 and allows the effective length of the thigh belt 50 to be adjusted.

Figure 6:
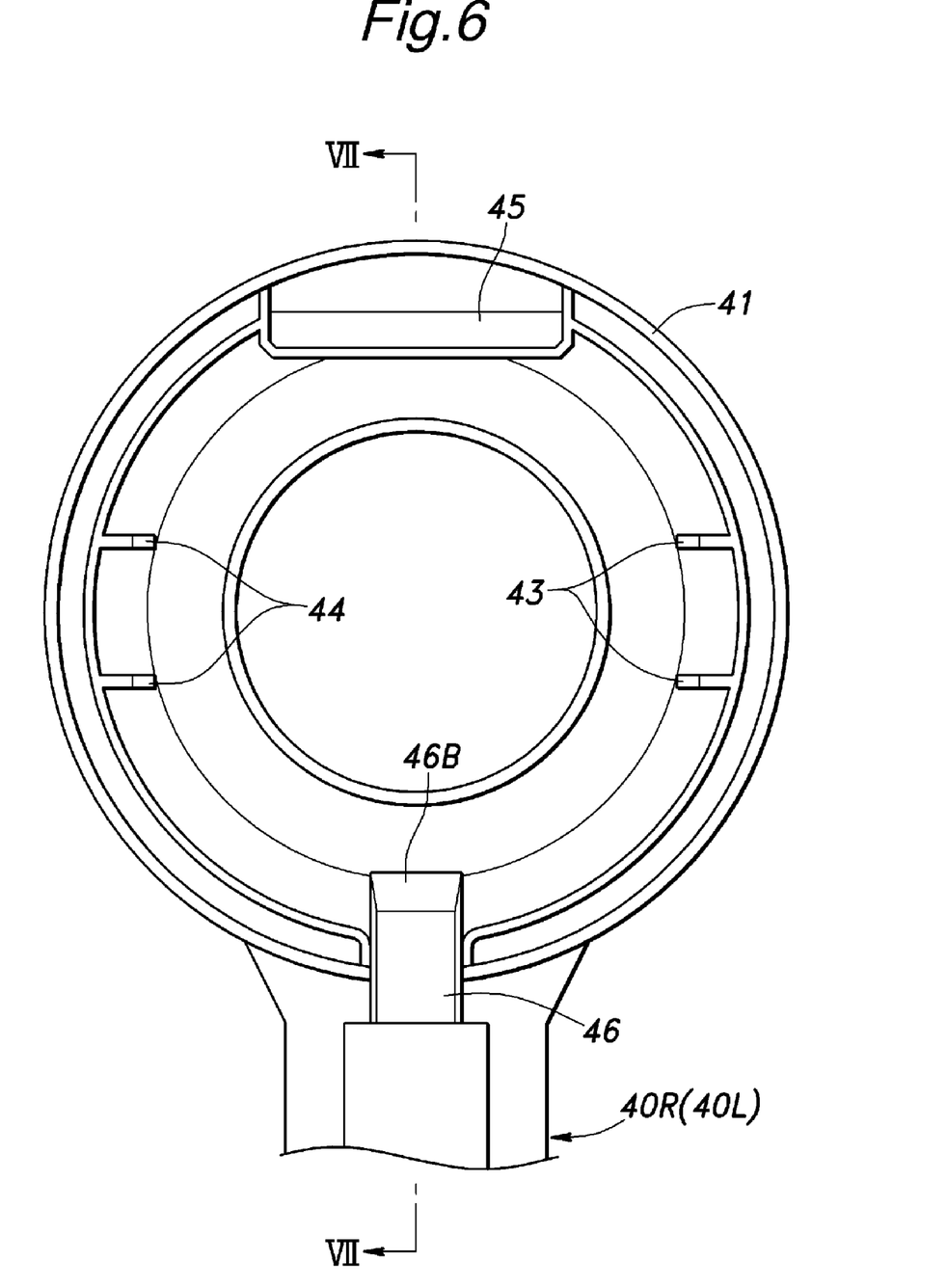
FIG. 6 is a rear view of a base end of a power transmitting arm of the power generator.
Figure 7:
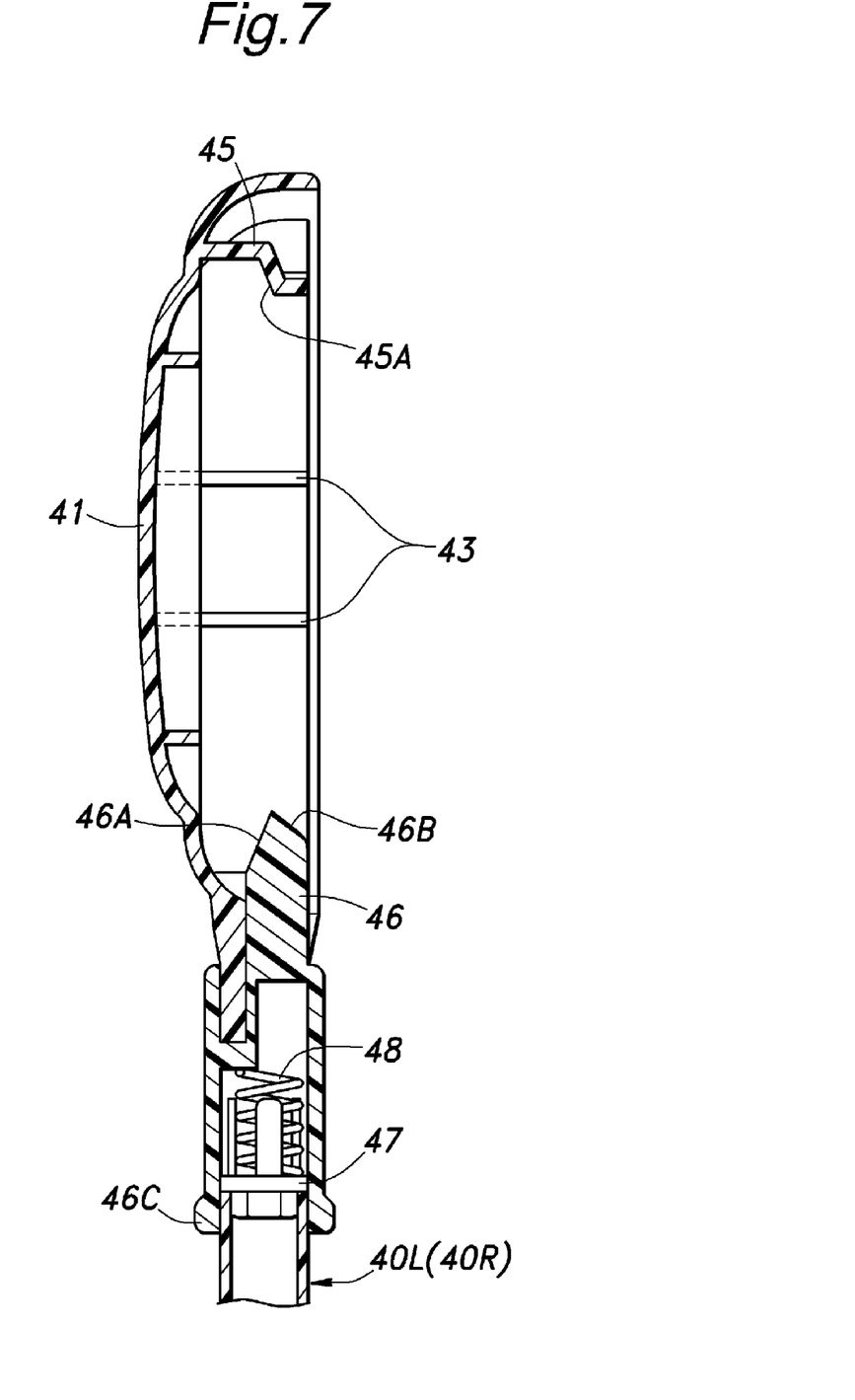
FIG. 7 is a sectional view taken along line VII-VII of FIG. 6.

The base end 41 of each power transmitting arm 40 is given with the shape of a shallow cup, and is internally formed with a tapered torque transmitting (internal) surface 43, 44 corresponding to the engagement faces 34, 35 of the output member 33. In the illustrated embodiment, each tapered torque transmitting surface 43, 44 is defined by a pair of ribs integrally formed with the base end and extending between a bottom wall and a corresponding side of a peripheral wall of the base end 41. The ribs are highly effective in improving the mechanical strength and rigidity of the base end 41 while minimizing the material and weight of the base end 41, particularly when the base end 41 is made of molded plastic material. A hooking member 45 is formed on the internal surface of the upper part of the peripheral wall of the output member 33. The hooking member 45 is formed as a rib given with the shape of a hook as seen in a sectional side view, and is configured to be engaged by the corresponding groove 38 of the output member 33. The hooking member 45 is provided with a slanted surface 45A that makes a surface contact with a slanted side surface 38A of the groove 38.

A latch member or a slider 46 is provided in a part of the peripheral wall of the base end 41 diametrically opposite to the hooking member 45. The slider 46 is supported so as to be slidable radially into and out of the base end 41, and is normally urged radially inward by a compression coil spring 48 supported by the base end 41 via a spring retainer 47. The slider 46 is configured to be engaged by the lower groove 39 of the output member 33, and is provided with a knob 46C to move the slider 46 out of the groove 39 against the spring force of the compression coil spring 48. The free end of the slider 46 is provided with a pair of slanted surfaces 46A and 46B. The slanted surface 46B facing the thigh of the user is less steep than the slanted surface 46A facing away from the thigh of the user (as one climbs toward the free end of the slider 46). A ridge is defined between the lower side face 37 and the axial end surface 33A of the output member 33, and a middle part of the ridge is recessed so as to define a sloping surface 33B. The sloping angles of the slanted surfaces 46B, 33B are determined such that the slider 46 retracts against the spring force of the compression coil spring 48 when the slanted surface 46B facing the thigh of the user is pushed against the slanted surface 33B formed in the ridge of the output member 35, and the slider 46 remains engaged by the groove 39 when the slanted surface 46A facing away from the thigh of the user is pushed against a side of the lower groove 39.

How the walking assistance device may be worn by a user is described in the following. First of all, the pelvic frame 10 (without the power transmitting arms 40) is worn by the user around the hip of the user by using the belly belt 20. At this time, the output member 33 of each electric motor 30 is angularly positioned at a home position (default position) where the side faces 36 and 37 are facing up and down, respectively. The motor controller may be configured such that the output member 33 is angularly positioned in this manner whenever the power to the electric motor is cut.

Figures 8A, 8B, 8C:
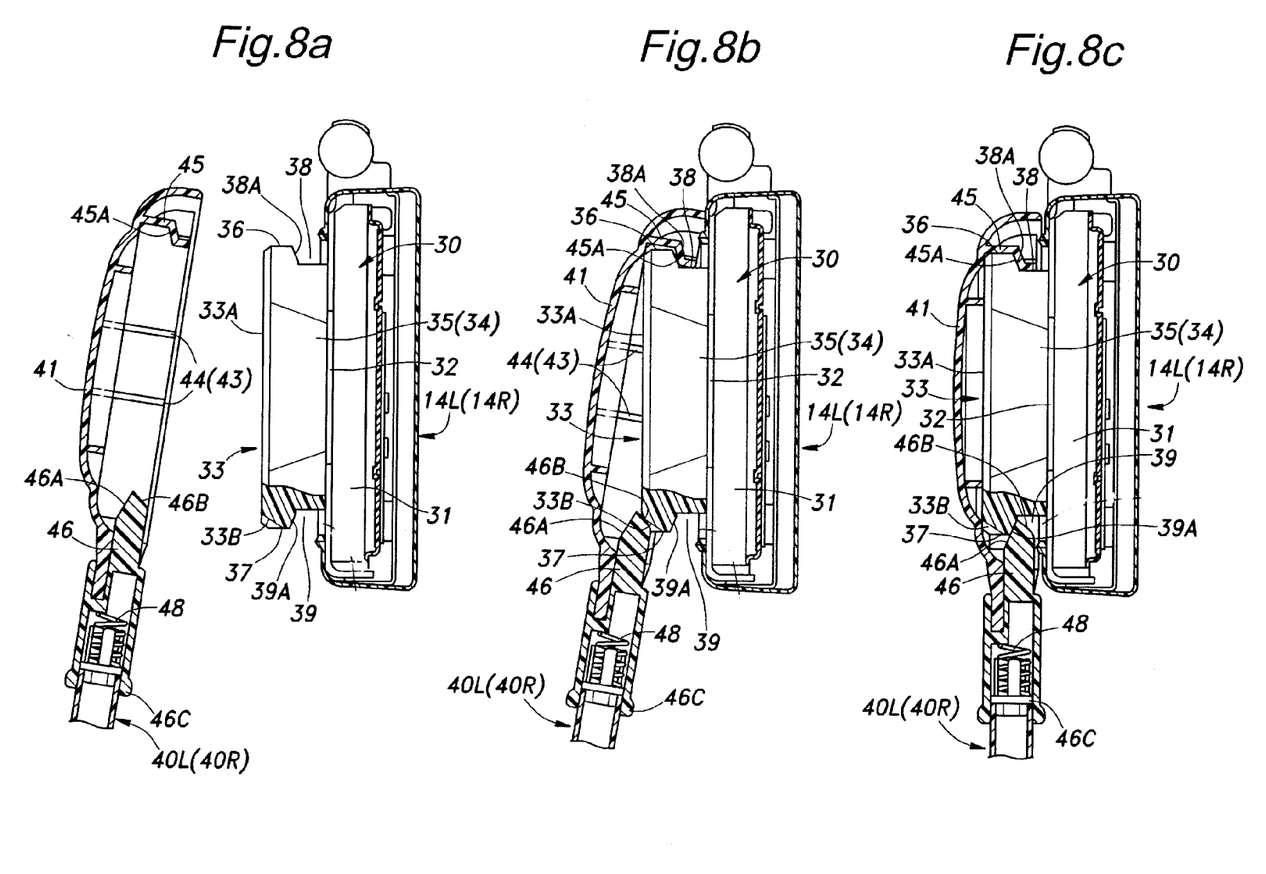
FIGS. 8a to 8c are sectional views taken along lines IV-IV of FIG. 3 and VII-VII of FIG. 6 demonstrating how the base end of the power transmitting arm may be attached to the power generator.

In attaching the power transmitting member 40 to the pelvic frame 10, the base end 41 of the power transmitting arm 40 is held by hand, and the upper end of the base end 41 is hooked onto the output member 33 of each electric motor 30 while the lower end of the base end 41 is kept spaced from the output member 33. Once the hooking member 45 of the base end 41 is engaged by the upper groove 38 of the base end 41, the lower end of the base end 41 is swung toward the output member 33 until the slider 46 is latched into the lower groove 39 of the output member 33.

As a result, the tapered torque transmitting surfaces 43 and 44 of the base end 41 make a surface to surface engagement with the corresponding engagement faces 34 and 35 of the output member 33. Thereby, the base end 41 and output member 33 are firmly joined to each other by virtue of the hooking member 45 and slider 46 engaging the upper and lower grooves 38 and 39 of the output member 33, and the output torque of the electric motor 30 can be transmitted to the power transmitting arm 40 by virtue of the surface to surface contact between the tapered torque transmitting surfaces 43 and 44 of the base end and corresponding engagement faces 34 and 35 of the output member 33.

As the slider 46 is pushed against the slanted surface 33B of the output member 33, the slider 46 is retracted radially outward against the spring force of the compression coil spring 48 owing to the cooperation between the slanted surfaces 46B and 33B abutting each other. Once the slider 46 rides over the ridge of the output member 33 at an end of the slanted surface 33B, the slider 46 is urged into the groove 39 under the spring force of the compression spring 48.

Thus, the power transmitting arm 40 can be attached to the output member 33 of the electric motor 30 simply by hooking an upper part of the base end 41 of the power transmitting arm 40 onto the upper groove 38 of the output member 33, and pushing the slider 46 provided in a lower part of the base end 41 onto the lower groove 39 of the output member 33. Therefore, the user wearing the pelvic frame 10 can easily attach the power transmitting arm 40 to the output end of the electric motor 30 by using a single hand with ease and without requiring a help from a caretaker.

At this time, as the slanted surface 46A of the slider 46 is pushed against the slanted surface 33B adjacent to the lower groove 39, and a slanted surface 45A of the hooking member 45 is pushed against the side surface 38A of the upper groove 38, the resulting force applied to the base end 41 pushes the tapered torque transmitting faces 43, 44 against the corresponding engagement faces 34, 35. Thereby, the power transmitting arm 40 and output member 33 are engaged to each other via a close contact between opposing tapered surfaces so that the base end 41 is kept firmly attached to the output member 33 against an axial movement. At the same time, the tapered torque transmitting surfaces 43 and 44 of the base end 41 is brought into surface to surface contact with the cooperating tapered surfaces of the engagement faces 34 and 35 of the output member 33 so that the output torque of the electric motor 30 can be transmitted to the power transmitting arm 40 without any play. Furthermore, the taper provided in the torque transmitting faces 34 and 35 of the output member 33 and tapered torque transmitting surfaces 43 and 44 of the base end 41 facilitates the fitting of the base end 41 onto the output member 33.

The slanted surfaces 46B and 33B of the hooking member 45 and output member 33 are not indispensable for the present invention. The free end of the slider 46 may be allowed to ride over the side face 39A (right immediately below the groove 39) by manually pushing down the slider 46 by using the knob 46C against the spring force of the compression coil spring 48. Thereafter, the thigh belt 50 may be wrapped wound the lower part of the thigh of the user.

The other power transmitting arm 40 can be attached to the pelvic frame 10 in a similar fashion. The removal of the power transmitting arm 40 can be effected in a similarly simple fashion. The slider 46 is pushed down by using the knob 46C against the spring force of the compression coil spring 48 until the slider 46 is disengaged from the lower groove 39. The hooking member 45 is then disengaged from the upper groove 38. These actions can also be executed by using a single hand.

Figure 9:
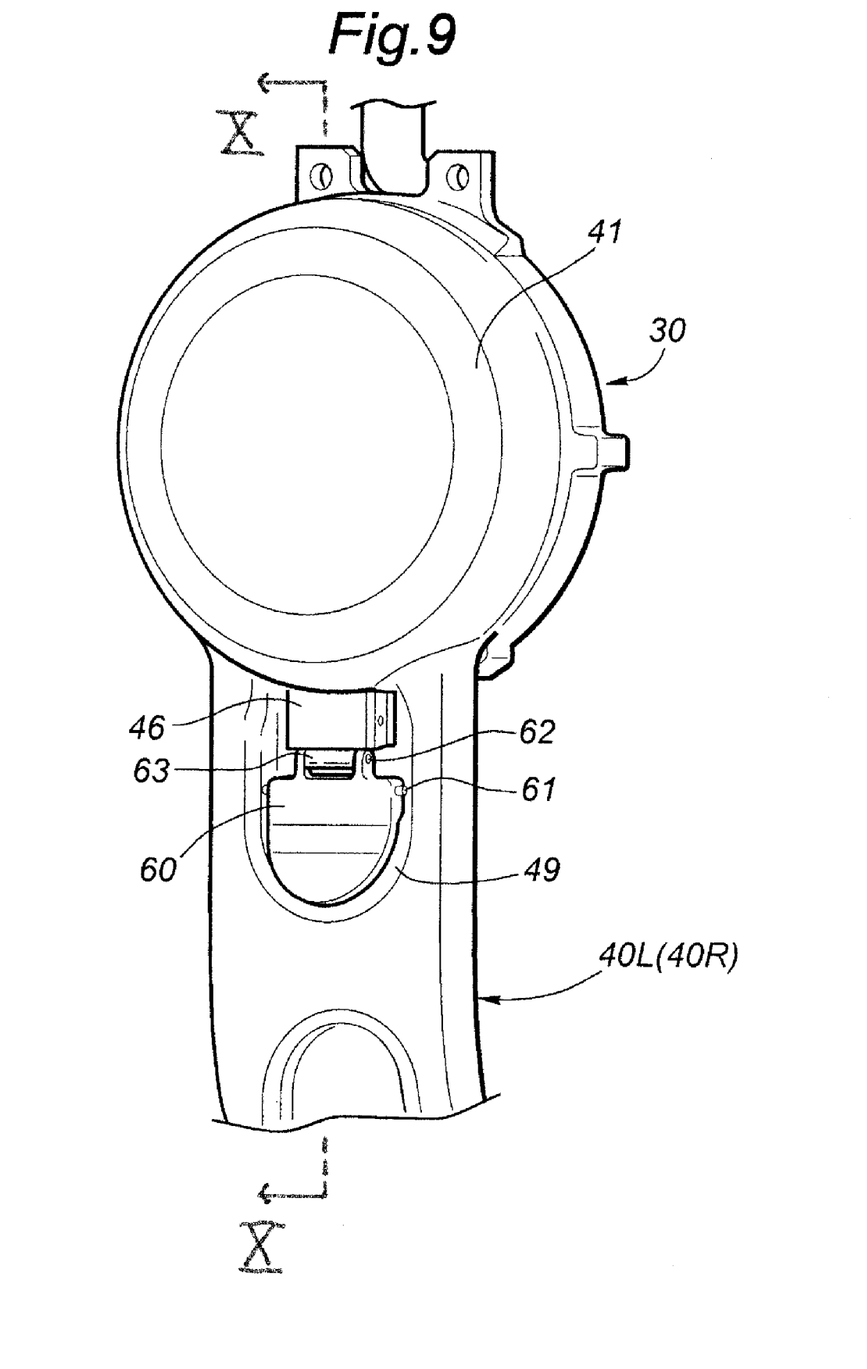
FIG. 9 is a fragmentary perspective view showing a second embodiment of the present invention.
Figure 10A:
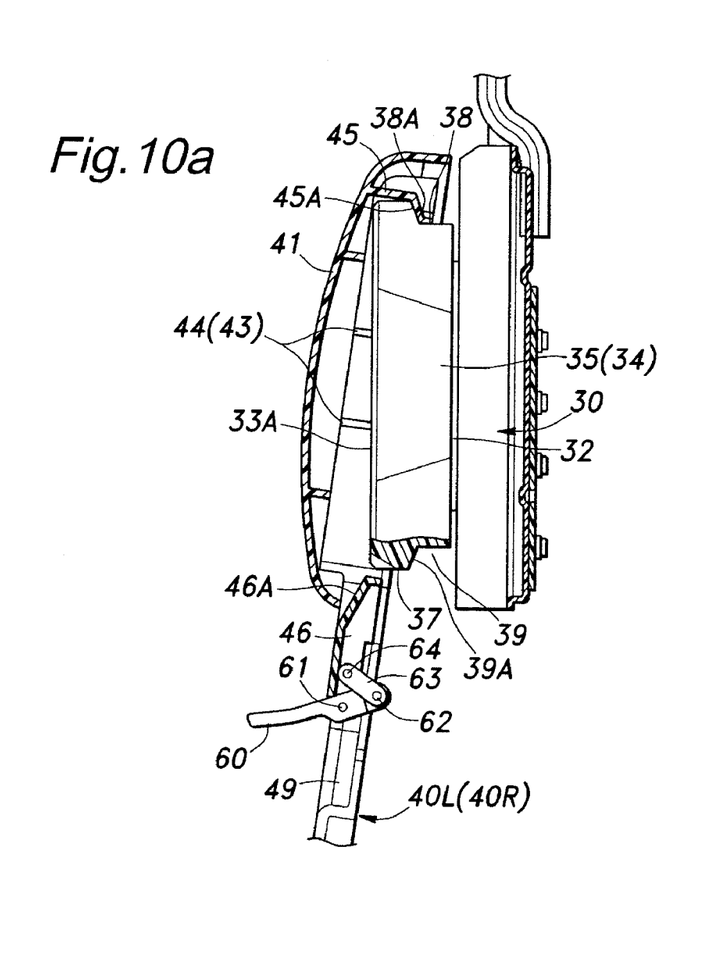
FIGS. 10a to 10d are sectional views taken along lines X-X of FIG. 9 demonstrating how the base end of the power transmitting arm may be attached to the power generator in the second embodiment.
Figure 10B:
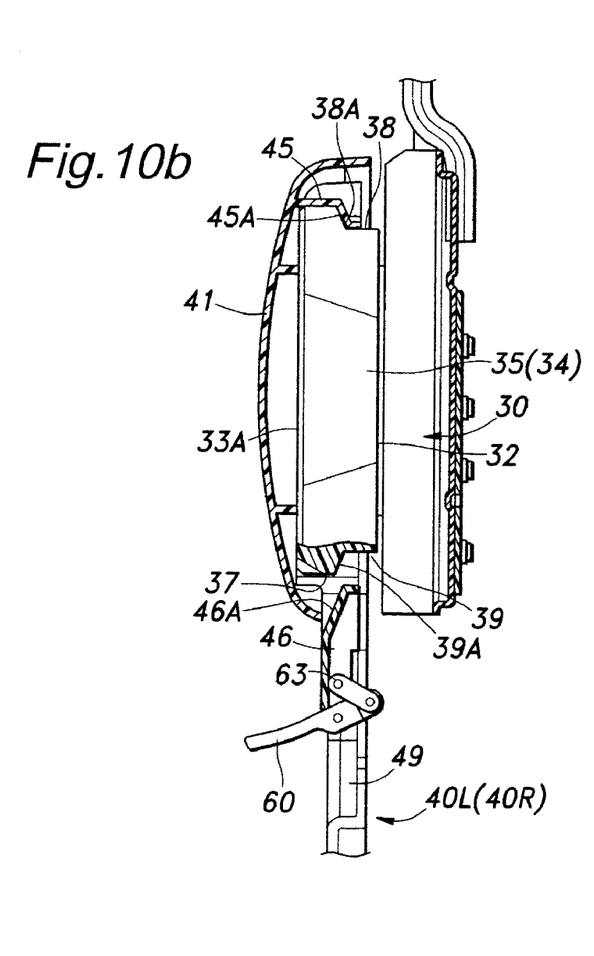
Figure 10C:
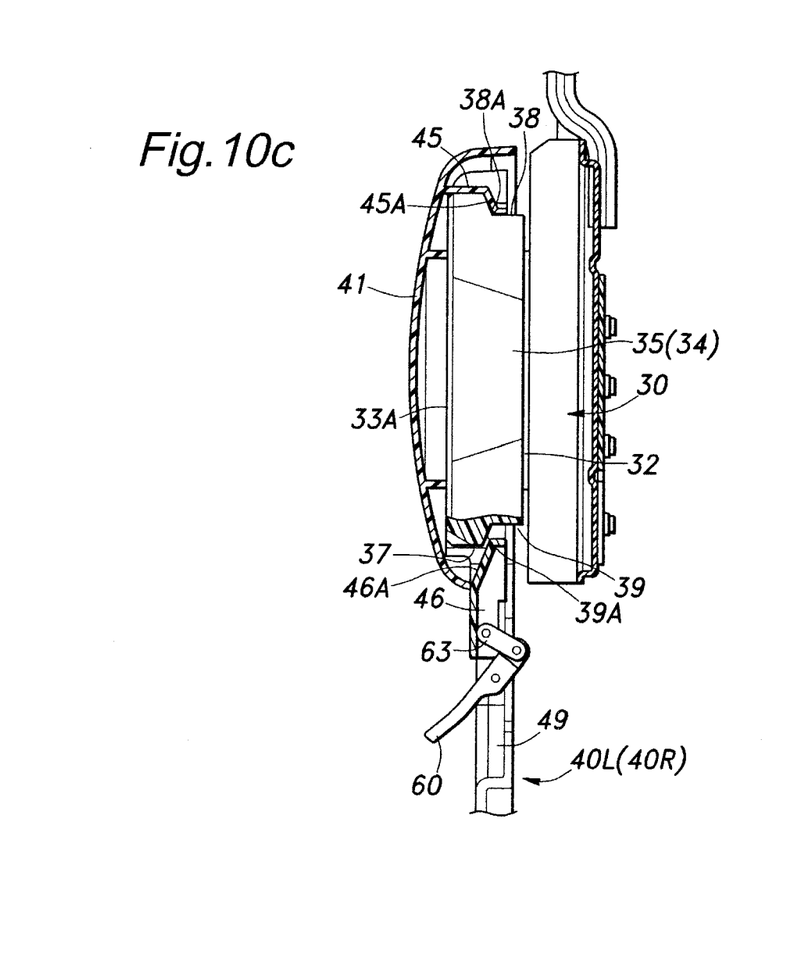
Figure 10D:
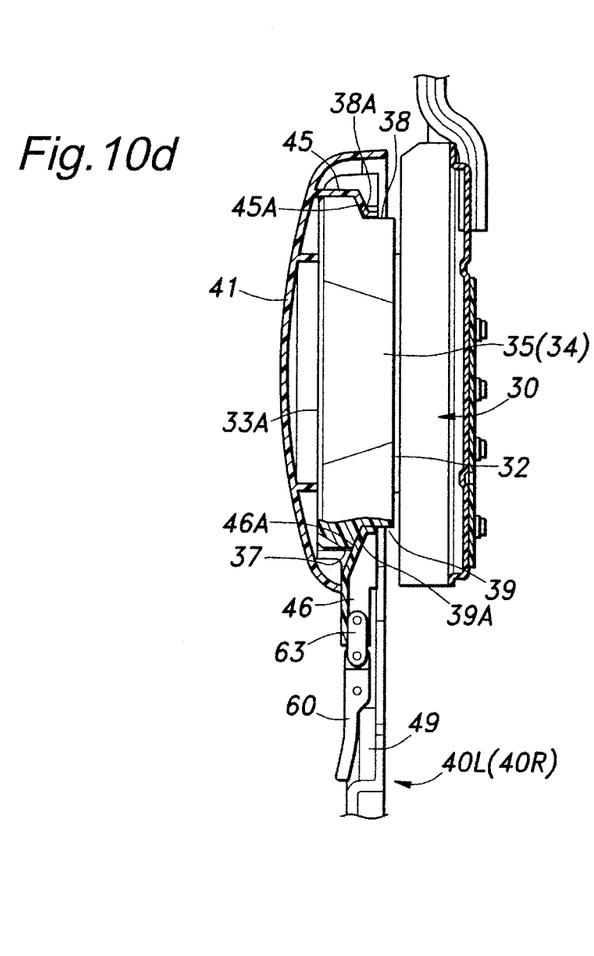

A second embodiment of the present invention is described in the following with reference to FIGS. 9 to 10d. In the second embodiment, the parts corresponding to those of the first embodiment are denoted with like numerals without repeating the description of such parts.

In this embodiment, a slider 46 similar to the slider of the previous embodiment is slidably guided in a lower part of the peripheral wall of the base end 41 of the power transmitting arm 40. A recess 49 is formed in a part of the power transmitting arm 40 adjacent to the base end 41 thereof to receive a manual lever 60 therein. The manual lever 60 is pivotally supported by the power transmitting arm 40 via a pivot shaft 61 extending laterally with respect to the power transmitting arm 40. The lower end of the lever 60 is configured to be operated by the user. The upper end of the lever 60 which is substantially closer to the pivot shaft 61 than the lower end is pivotally connected at pivot shaft 62 to an end of a toggle link 63, and the other end of the toggle link is pivotally connected at pivot shaft 64 to an end of the slider 46. Therefore, by raising the lower end of the manual lever 60 away from the power transmitting arm 40, the slider 46 is forced out of the based end 41 via the toggle link 63. Conversely, by lowering the lower end of the manual lever 60 toward the power transmitting arm 40, the slider 46 is forced into the base end 41 via the toggle link 63. In particular, when the lower end of the manual lever 60 is lowered and the slider 46 is forced into the based end 41, the pivot points of the manual lever 60 and toggle link 63 are lined up with the direction of the guided movement of the slider 46 so that the slider 46 is firmly retained in the base end 41, and can maintain the position thereof even when a substantial external force is applied to the slider 46. Also, when the lower end of the manual lever 60 is lowered, the manual lever 60 is substantially received within the recess 49.

How the walking assistance device of the second embodiment may be worn by a user is described in the following. First of all, the pelvic frame 10 (without the power transmitting arms 40) is worn by the user around the hip of the user by using the belly belt 20. At this time, the output member 33 of each electric motor 30 is angularly positioned at a home position (default position) where the side faces 36 and 37 are facing up and down, respectively. The motor controller may be configured such that the output member 33 is angularly positioned in this manner whenever the power to the electric motor is cut.

The manual lever 60 of the power transmitting arm 40 is raised out of the recess 49, causing the toggle link 63 to be tilted and the slider 46 to be retracted out of the peripheral wall of the based end of the power transmitting member 40.

The base end 41 of the power transmitting arm 40 is then held by hand, and the upper end of the base end 41 is hooked onto the output member 33 of each electric motor 30 while the lower end of the base end 41 is kept spaced from the output member 33. Once the hooking member 45 of the base end 41 is engaged by the upper groove 38 of the output member 33, the lower end of the base end 41 is swung toward the output member 33 until the tapered torque transmitting surfaces 43 and 44 of the base end 41 make a surface to surface engagement with the corresponding engagement faces 34 and 35 of the output member 33.

Then, the lower end of the manual lever 60 is lowered into the recess 49, and this causes the free end of the slider 46 to be fitted into the lower groove 39. Once this state is achieved, the base end 41 is firmly retained by the output member 33, and the user can release the base end 41 from his or her hand. As a result, the base end 41 of the power transmitting arm 40 is firmly retained by the output member 33 by virtue of the engagement of the hooking member 45 with the upper groove 38 and the engagement of the slider 46 with the lower groove 39. Additionally, the output torque of the electric motor 31 can be transmitted to the power transmitting arm 40 by virtue of the surface to surface contact between the slanted surfaces 43 and 44 of the base end 41 and corresponding engagement faces 34 and 35 of the output member 33.

Thus, the power transmitting arm 40 can be attached to the output member 33 of the electric motor 31 simply by hooking an upper part of the base end 41 of the power transmitting arm 40 onto the upper groove 38 of the output member 33, and pushing the slider 46 provided in a lower part of the base end 41 onto the lower groove 39 of the output member 33 by means of the toggle action of the toggle link 63 actuated by the manual lever 60. Therefore, the user wearing the pelvic frame 10 can easily attach the power transmitting arm 40 to the output end of the electric motor by using a single hand with ease and without requiring a help from a caretaker. Thereafter, the thigh belt 50 is wrapped wound the lower part of the thigh of the user.

The removal of the power transmitting arm 40 from the output member 33 can be effected by reversing the procedure discussed above, and this also can be accomplished with a single hand without requiring a help of a caretaker.

Although the present invention has been described in terms of a preferred embodiment thereof, it is obvious to a person skilled in the art that various alterations and modifications are possible without departing from the scope of the present invention which is set forth in the appended claims. For instance, the hooking member 45 in the foregoing embodiments is shaped like a hook in a sectional side view, but this is only exemplary and other arrangements may also be used as long as a similar hooking action is enabled. As an alternative, the hooking member may consist of an opening which is configured to be hooked onto an engagement feature suitably projecting from the output member 33. A hook to hook engagement is also possible. Also, the torque transmitting faces of the foregoing embodiments were formed on lateral sides of the output member, but may also be formed in the upper and lower sides of the output member or any other peripheral parts as long as they do not interfere with the hooking action of the hooking member and latching action of the latch member. If desired, the power generator may also be configured to be detachable from the pelvic frame for an added convenience.

The contents of the original Japanese patent application on which the Paris Convention priority claim is made for the present application, as well as the contents of any prior art mentioned in this application, are incorporated in this application by reference.

The invention claimed is:

1. A walking assistance device, comprising:
a pelvic frame configured to be worn on a pelvic part of a user and extending from a lower back of the user to either side of the pelvic part of the user;
a rotary power generator attached to each side part of the pelvic frame; and
a power transmitting arm having a base end detachably connected to an output member of the rotary power generator, and the power transmitting arm having a free end extending downward from the base end and fitted with a support member for supporting a lower part of a thigh of the user;
wherein the output member is provided with an upper side face formed on an upper side of the output member, a lower side face formed on a lower side of the output member and a pair of upper and lower grooves formed on a diametrically opposing side of the output member and slanted toward a rotational center shaft of the output member and a free axial end of the shaft; and
wherein the base end of the power transmitting arm comprises a hooking member configured to be engaged by the upper side face of the output member, a latch member provided in a part of the base end diametrically opposing the hooking member and configured to detachably engage the lower side face of the output member, and a pair of slanted engagement faces complementary to the upper and lower grooves of the output member, each slanted engagement face, one slanted engagement face disposed in the base end and the other slanted engagement face disposed in the latch member, make surface to surface contact to the corresponding upper and lower grooves of the output member when the hooking member is hooked on the upper side face and the latch member is engaged by the lower side face.

2. The walking assistance device according to claim 1, wherein the latch member is guided for a radial inward movement with respect to the base end to a position for engaging the lower side face and a radially outward movement with respect to the base end for disengaging the lower side face, and provided with a knob for manual operation thereof, and the base end further comprises a spring member that urges the latch member to the position for engaging the lower side face.

3. The walking assistance device according to claim 2, wherein at least one of a free end of the latch member and lower side face is provided with a slanted surface that causes the latch member to move radially outward when the latch member is pushed against the lower side face.

4. The walking assistance device according to claim 1, wherein the latch member is guided for a radial inward movement with respect to the base end to a position for engaging the lower side face and a radially outward movement with respect to the base end for disengaging the lower side face, and the base end further comprises a manual lever pivotally supported by the base end at a first pivot point and a toggle link having a first end pivotally connected to an end of the manual lever at a second pivot point and a second end pivotally connected to an end of the latch member at a third pivot point, the first, second and third pivot points being aligned along a line of movement of the latch member when the latch member is at the position for engaging the lower side face.

5. The walking assistance device according to claim 1, wherein the upper side face includes a horizontal groove having an upwardly facing opening.

6. The walking assistance device according to claim 1, wherein the base member comprises a cup-shaped member having an open side adapted to be facing the user and having the hooking member and tapered surfaces formed in an inner part of the cup-shaped member.

7. The walking assistance device according to claim 6, wherein the latch member is passed across a lower peripheral wall of the cup-shaped member.

8. The walking assistance device according to claim 6, wherein each tapered surface of the base end is defined by a pair of ribs extending between a bottom wall and a peripheral wall of the cup-shaped member.

* * * * *